United States Patent [19]

Takeura et al.

[11] Patent Number: 4,807,073
[45] Date of Patent: Feb. 21, 1989

[54] MAGNETORESISTANCE TYPE MAGNETIC HEAD AND METHOD FOR FABRICATING SAME

[75] Inventors: Tooru Takeura, Odawara; Kazuhiro Momata, Chigasaki, both of Japan

[73] Assignee: Hitachi, Ltd., Tokyo, Japan

[21] Appl. No.: 40,127

[22] Filed: Apr. 20, 1987

[30] Foreign Application Priority Data

Apr. 18, 1986 [JP] Japan ................... 61-87906

[51] Int. Cl.⁴ ............................ G11B 5/12; G11B 5/30
[52] U.S. Cl. ................................. 360/113; 360/125; 338/32 R
[58] Field of Search ............... 360/113, 127, 123; 338/32 R

[56] References Cited

U.S. PATENT DOCUMENTS

| | | |
|---|---|---|
| 3,813,692 | 5/1974 | Brock et al. ................ 360/113 |
| 3,814,863 | 6/1974 | O'Day et al. ................ 360/113 |
| 4,024,489 | 5/1977 | Basorek et al. ................ 338/32 R |
| 4,354,212 | 10/1982 | Nouchi et al. ................ 360/113 |
| 4,423,451 | 12/1983 | Chi ................ 360/125 |
| 4,523,243 | 6/1985 | Billington ................ 360/113 |
| 4,642,716 | 2/1987 | Wakabayashi et al. ........ 360/113 X |

Primary Examiner—John H. Wolfe
Attorney, Agent, or Firm—Antonelli, Terry & Wands

[57] ABSTRACT

A magnetoresistance type magnetic head, in which a magnetoresistance film is disposed through an insulating film between two soft magnetic bodies, and a signal leadout conductor for the magnetoresistance film is disposed in the insulating film so that its surface is at the same level as that of the insulating film, thereby providing a high-performance magnetoresistance type magnetic head, in which the gap length is small and the resistance of the signal leadout conductor portion is small.

23 Claims, 3 Drawing Sheets

MAGNETORESISTANCE TYPE MAGNETIC HEAD AND METHOD FOR FABRICATING SAME

BACKGROUND OF THE INVENTION

This invention relates to the construction of a magnetoresistance (hereinbelow abbreviated to MR) type magnetic head and in particular to a shunt bias type MR head suitable for a high density recording devices.

The construction of prior art shunt bias type MR heads is disclosed in U.S. Pat. Nos. 3,814,863 and 3,813,692. The construction is shown in FIG. 7. According to the prior art techniques, an MR film 5 having a desired form made of Permalloy, etc. and a shunt film 4 made of titanium, molybdenum, etc. are superposed through an insulating film 2 made of e.g. alumina serving as a first head gap on a ferrite substrate 1 serving as a shield at the rear portion of these elements are disposed bonding pads 15 for connecting the exterior of the head with leads. The head is so constructed that another insulating film 6 made of e.g. alumina, etc. serving as a second head gap is formed on this ferrite substrate 1 and a ferrite plate 7 serving as a shield is adhered thereto. In the MR head constructed as described above, the height i of the ferrite plate 7 should be as great as possible so that it has a shield effect sufficient for the MR head not to sense the unnecessary part of the leakage flux from the recording medium. Moreover the reliability of the adhesion is increased by enlarging the area of the adhesion in order to increase the adhesion strength. Consequently, the distance l from the extremity of the element to the bonding pads 15 is large. For this reason, the resistance of a signal extracting part or electrical leads is great and the DC resistance of the overall element is also great. Therefore, when detection current flows through the element described above, the amount of produced heat is increased by that corresponding to the increase of the resistance of the element. Further, there is another problem that, when the amount of produced heat increases, thermal noise is also increased and the signal to noise (S/N) ratio is lowered.

As a method for solving the problem stated above, a construction is conceivable by which a conductor having a low resistivity is extended to the extremity of the MR element. U.S. Pat. No. 4,024,489 has proposed this construction. The construction proposed thereby is shown in FIGS. 8A and 8B. FIG. 8A indicates a perspective view of this construction and FIG. 8B indicates a side view of the element indicated in FIG. 8A, seen along the arrow A. The resistance of the signal extracting part s lowered to be negligibly small by forming a signal leadout conductor 3 having a low resistivity extending from the bonding pad portion to the extremity of the element, as indicated in FIG. 8A, and thus, the problem stated above can be resolved. However, when the ferrite plate 7 is adhered, a crevice B having a thickness corresponding to that of the signal leadout conductor 3 is produced between the shunt film 4 and the insulating film 6 at the extremity portion of the element by forming the signal leadout conductor 3, as indicated in FIG. 8B.

Since the length of the second gap of the shield type MR head is the interval between the MR film 5 and the ferrite plate 7, in such a structure the length of the second gap is determined by the sum of the thickness of the shunt film 4, that of the signal leadout conductor 3 corresponding to the crevice B and that of the insulating film 6. Thus, it can be understood that it is a structure which is not suitable for narrowing the second gap by the fact that it gives rise to the crevice B. Further, in the case where the ferrite substrate 1, on which the insulating film 2, the MR film 5, the shunt film 4 and the signal leadout conductor 3 are formed, is connected with a ferrite plate 7, on which the insulating film 6 is formed, by using an adhesive, etc., unless the adhesive is sufficiently hard with respect to the shunt film 4, when the surface of the MR head is finished by lapping, etc., the shunt film 4 is deformed so that a part thereof bites the adhesive injected into the crevice B due to working stress, etc. Since this gives rise to unevenness in characteristics of the head, sufficient attention should be paid to the selection of the adhesive.

As stated previously, for the prior art shunt bias type MR head, in the example indicated in FIG. 7, since it is necessary that l should be long for the reason described above, the resistance of the overall MR head is great and the amount of produced heat is increased by making the detection current flow therethrough. This causes a problem to increase thermal noise. On the other hand, in the example indicated in FIGS. 8A and 8B, in which the signal leadout conductor 3 is formed in order to solve this problem, there are other problems that the spacing B is produced between the shunt film 4 and the insulating film 6, and that it is difficult to reduce the length of the second gap of the shield type MR head.

SUMMARY OF THE INVENTION

An object of this invention is to provide a high performance MR head enabling the length of the second gap of the MR head to be made as small as possible and to obtain a high S/N ratio without increasing the electric resistance of the MR head.

The object described above can be achieved by a construction, in which the signal leadout conductor is disposed so that the surface thereof is at the same level as or slightly lower than the surface of the insulating film forming a first head gap and the MR film and the shunt film are superposed thereon, instead of the construction, in which the signal leadout conductor 3 is superposed on the MR film 5 and the shunt film 4, as indicated in FIGS. 8A and 8B.

By this construction, even if the signal leadout conductor is extended to the extremity portion of the MR element, since no crevice due to the signal leadout conductor indicated in FIGS. 8A and 8B is produced, the length of the second gap, which is the interval from the MR film 5 to the ferrite plate 7, may not be unnecessarily large. Further, if the signal leadout conductor is made of a substance having a low resistivity or the thickness thereof is sufficiently great, since the resistance of the signal leadout conductor can be almost negligibly small, the resistance of the overall head can be reduced to the resistance of the part sensing the magnetic flux, i.e. the resistance of the extremity portion of the MR element.

DESCRIPTION OF THE PREFERRED EMBODIMENTS

Figure 1A:
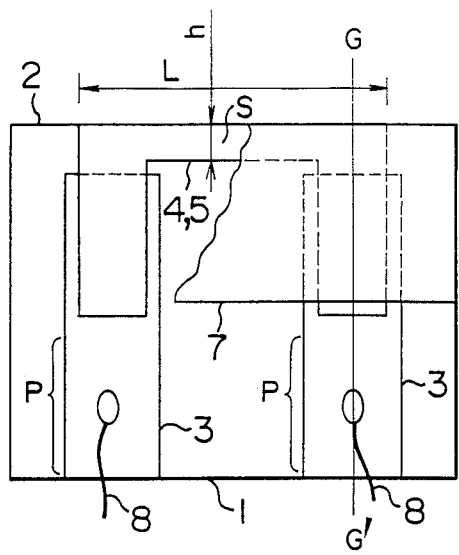
FIG. 1A is a plan view showing the construction of an embodiment according to this invention.
Figure 1B:
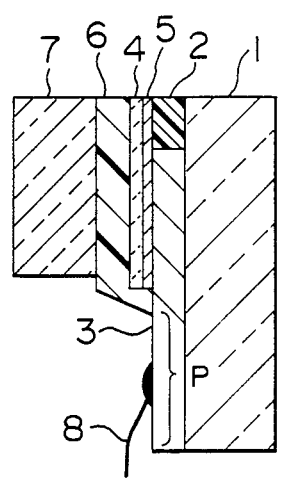
FIG. 1B is a cross-sectional view of the embodiment indicated in FIG. 1A along G—G'.

An embodiment according to this invention will be explained below, referring to FIGS. 1A to 1F. FIG. 1A is a plan view showing the construction of the embodiment and FIG. 1B is a cross-sectional view of the embodiment indicated in FIG. 1A along G—G'. A signal leadout conductor 3 made of a metal having a low resistivity such as Au, Cu, Al, etc. is disposed on an insulating soft magnetic ferrite substrate 1 so that the surface thereof is at the same level as that of an inorganic insulating film 2 made of e.g. alumina, silicon dioxide, etc., which forms a first gap. An MR film 5 and a shunt film 4 having a desired form and film thickness are disposed thereon and further a shield ferrite plate 7 is adhered thereto through a second inorganic insulating film 6. The signal leadout conductor 3 extends downward in the direction opposite to the extremity of the head and includes the pad portion P, where leads for leadout signals to the exterior of the head are connected. Therefore it is necessary to remove the portion of the insulating film 6, which corresponds to the pad portion P of the signal leadout conductor 3. Although the insulating film 6 is attached to the ferrite substrate 1 including the MR film 5, it may be attached to the ferrite plate 7.

Here, the thickness of the insulating film 2 is a factor influencing remarkably the resolving characteristics of the reproduction head and it should have an appropriate value corresponding to the magnetization reversal interval recorded in the recording medium. For example, when signals which are recorded in a recording medium with a magnetization reversal interval of 1 $\mu$m are reproduced, the thickness of the insulating film 2 preferably has a value of an order of 0.4–0.8 $\mu$m Further, the MR film 5 may be made of Ni-Fe, Ni-Co, etc. having a large MR effect and such a composition that the magneto-striction constant is at the proximity of zero (81Ni-19Fe for Ni-Fe). The thickness of the MR film is suitably 20–100 nm. In addition, the shunt film 4 is electrically connected with the MR film 5 and when a detection current for detecting variations in the resistance of the MR film 5 flows therethrough, it is branched therefrom and flows also through the shunt film 4. In this case, it is necessary to choose the film thickness and the resistivity in such a manner that the detection current is divided so that the magnetic field produced by the current flowing through the shunt film 4 is applied to the MR film 5 as an optimum bias magnetic field and that the variations in the resistance of the MR film 5 can be detected with the greatest efficiency. For example, in the case where an MR film 20–100 nm thick is made of Ni-Fe, substances having a resistivity which is slightly greater than that of the MR film, such as Ti, Mo, Ta, etc., can be used for the shunt film 4 and its optimum thickness is chosen to be an order of 100 to 300 nm. Furthermore, since the thickness of the insulating film 6 influences not only the resolving characteristics of the reproduction head, but also the bias magnetic field applied to the MR film 5, it is necessary to choose the optimum thickness therefor.

Figure 8A:
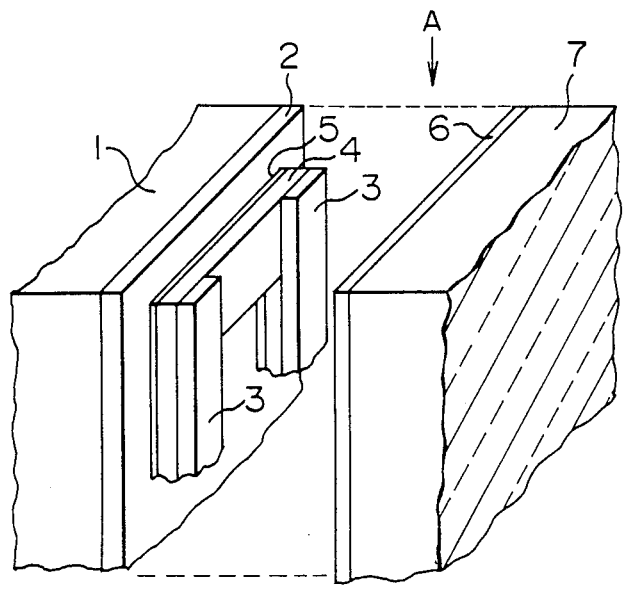
Figure 8B:
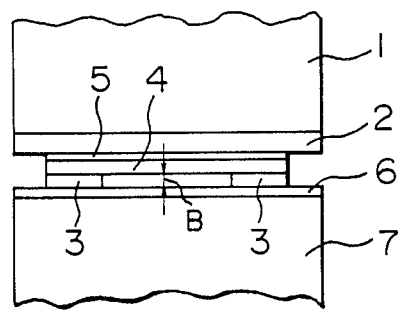
FIG. 8B is a side view of the element indicated in FIG. 8A, seen in the direction shown by the arrow A therein.

In such a structure, supposing e.g. that the length (L in FIG. 1A) of the MR film 5 is approximately equal to the track width of the reproduction head, which is 0.1 mm, and that the height h of the MR film 5 is about 10 $\mu$m, the resistance of the extremity portion is in the range of about several tens to several hundreds ohms. On the other hand, the reliability of the adhesion of the ferrite plate 7 being taken into account, the signal leadout conductor 3 is formed so as to be sufficiently long, e.g. about 10 mm, from the extremity portion to the pad portion P. In the case where the thickness of the signal leadout conductor 3 is smaller than that of the insulating film 2 and as small as 0.4 $\mu$m at the smallest case, and where it is made of a metal having a low resistivity such as Cu, the resistance of the signal taking out conductor is below a few ohms, which is smaller than 10% of that of the MR film 5 and the shunt film 4. Consequently, heat produced by the detection current flowing therethrough is generated almost at the portion S, which is the extremity portion of the MR element and the amount of the produced heat can be reduced to the minimum. In this way, increase of the thermal noise is prevented and thus, it is possible to obtain a reproduction head having a high S/N ratio. Furthermore, this structure gives rise to no crevice B indicated in FIG. 8B and therefore, there is no restriction that the second gap of the MR head should be longer than that required.

Now, several fabrication methods to make the structure described above will be explained below. A first example is shown from FIGS. 1C to 1F. FIGS. 1C to 1F are longitudinal cross-sectional views of the embodiment indicated in FIG. 1A along G—G' in various fabrication steps.

A signal leadout conductor 3 is formed by depositing a metal having a low resistivity by a suitable method such as plating, evaporation, sputtering, etc. on an insulating ferrite substrate 1 made of e.g. NiZn ferrite serving as a shield and by etching by a method such as photolithography, etc. so as to obtain a desired form, including the pad portion P indicated in FIG. 1A, where the leads for taking out signals to the exterior of the head are connected. Further, an insulating film 2 (e.g. Al$_2$O$_3$, SiO$_2$, etc.), which will be a first gap, is deposited thereon by a method such as sputtering, etc. in such a manner that the film has a uniform thickness on the entire surface and that the ferrite substrate 1 does not strain by stress. This state is shown in FIG. 1C.

Figure 1C:
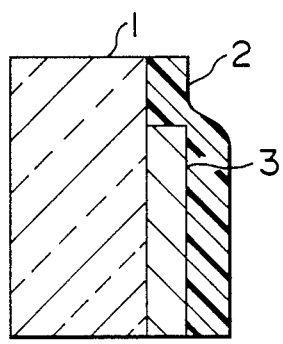
FIGS. 1C to 1F are longitudinal cross-sectional views representing steps for fabricating the embodiment indicated in FIG. 1A.
Figure 1D:
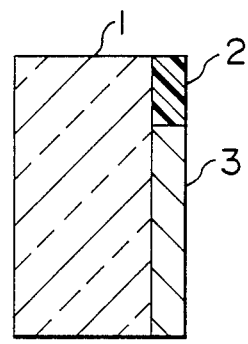

Next, only the insulating film 2 on the signal leadout conductor 3 indicated in FIG. 1C is worked by lapping, etc. so that the signal leadout conductor 3 appears at the surface and that the insulating film 2 and the signal leadout conductor 3 have a desired thickness. Then, the worked surface is cleaned so that there remains no dirt. At this time, it is preferable to effect treatment such as sputter cleaning, etc. in order to remove oxides etc. on the surface of the signal leadout conductor 3. This state is indicated in FIG. 1D.

After that, an MR film 5 and a shunt film 4 are deposited by a method such as evaporation, sputtering, etc. In this the MR film 5 is formed by using a substance having an excellent MR effect such as Permalloy, etc. Furthermore, as stated previously, it is necessary to choose the resistivity of the substance and the film thickness in such a manner that the detection current is divided to the MR film 5 and the shunt film 4 so that the magnetic field produced by the current flowing through the shunt film 4 forms the optimum bias magnetic field applied to the MR film 5 and the output detected by the current flowing through the MR film is greatest. In addition, when the shunt film is deposited, it is preferable to form it with such a temperature of the substrate that no diffusion can occur between the metals forming the shunt film 4 and the MR film 5, in order to prevent deterioration of the characteristics of the MR film 5.

Figure 1E:
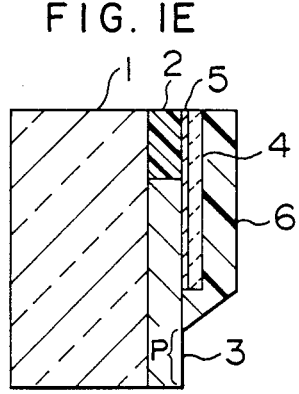
Figure 1F:
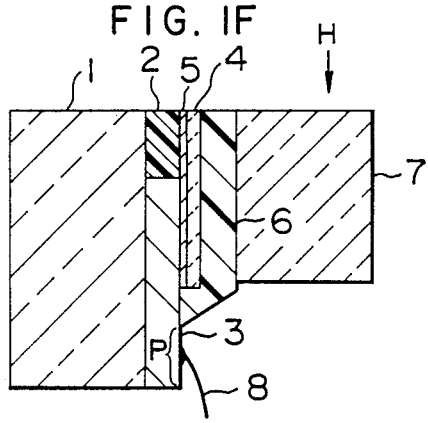

Subsequently a photoresist layer is formed by a method such as photolithography, etc. in such a shape that the MR film 5 and the shunt film 4 are connected with the signal leadout conductor 3 and patterning is effected by a method such as ion milling, sputter etching, inverse plating, etc. so that all the films have predetermined shapes. Then, an insulating film 6, which will be a second gap, is deposited on the entire surface by a method such as sputtering, etc. at such a temperature of the substrate that no diffusion can occur between the MR film 5 and the shunt film 4 and patterning is effected by a method such as ion milling, sputter etching, etc. so that the insulating film 6 has the pad portion P, where the external leads are connected, by utilizing a method such as photolithography, etc. The structure of the substrate 1 side formed in this way is shown in FIG. 1E. An insulating ferrite plate 7, which will be a shield, is adhered to the substrate 1 side thus formed by means of a substance such as resin, glass, etc. at such a temperature that no diffusion can occur between the MR film 5 and the shunt film 4 in such a manner that there is no crevice between the insulating film 6 and the ferrite plate 7. Thereafter, a head is completed by working mechanically the surface H of the head opposing the magnetic medium and connecting leads 8 by wire bonding, etc. to the pad portion P. This state is shown in FIG. 1F.

A detection current is made to flow through the head thus constructed by means of the leads 8. Then, the detection current flows through the signal leadout conductor 3 to be led to the MR film 5 and the shunt film 4 and it is divided, depending on their resistances. Then, a bias magnetic field is produced by the current divided to the shunt film 4 and applied to the MR film 5. The amount of the magnetic flux from the magnetic medium opposing surface H side is sensed by the MR element 5 and the MR varies therein, which is detected by the current divided to the MR film 5 as the output. The output thus detected is led out by the leads 8 through the signal leadout conductor 3 to the exterior and treated.

According to this fabrication method, since only the insulating film 2 on the signal leadout conductor 3 is lapped, after the insulating film has been deposited on the entire surface, the insulating film 2 is formed on the surface other than the surface, where the signal leadout conductor 3 is formed. Therefore, there is no fabrication step for aligning the pattern of the insulating film and that of the signal leadout conductor 3 and thus, no divergence can occur in the pattern alignment of the insulating film 2 and the signal leadout conductor 3. Further, since unevenness due to dust, etc. attached thereto during the formation of the films is flattened mechanically by lapping, when the ferrite plate 7 for the shield is adhered to the ferrite substrate 1 side, there is no unevenness due to dust, etc. attached thereto before the formation of the insulating film 2 and thus, the production of the crevice at the adhesion portion can be reduced.

Figure 2A:
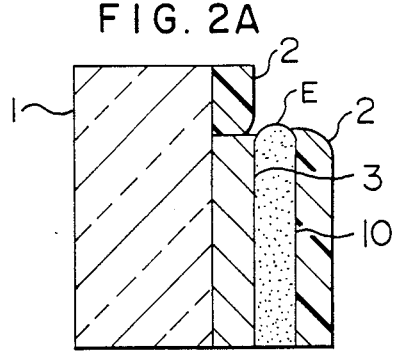
FIGS. 2A and 2B and FIGS. 3A and 3B are longitudinal cross-sectional views representing steps in the course of the fabrication according to two other different fabrication methods.
Figure 2B:
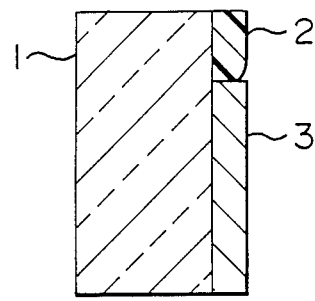

Now, another fabrication method will be explained below, referring to FIGS. 2A and 2B. FIGS. 2A and 2B are longitudinal cross-sectional views indicating the same part as that cut along G—G' in FIG. 1A. A metal, which will be the signal leadout conductor 3, is deposited on the ferrite substrate 1 explained, referring to FIG. 1C, by a method similar to that described above. Then, a mask 10 is formed thereon by a method such as photolithography, etc., which mask corresponds to the desired shape of the signal leadout conductor 3 including the pad portion, where the leads for leading out signals to the exterior of the head are connected. For this mask 10 a substance is selected, for which the lift-off method is applicable for forming subsequently the insulating film 2. Then, the signal leadout conductor 3 is formed to a desired shape by etching.

Thereafter, the insulating film 2 is deposited by a method such as sputtering, etc. on the entire, surface, while leaving the mask as it is. FIG. 2A indicates this state.

Subsequently, only the insulating film 2 on the mask 10 is removed. This can be done by removing the insulating film 2 superposed on the mask 10 together with the mask 10, while immersing the films thus superposed on each other in a mask substance solving solution, which does not etch the signal leadout conductor 2 and the insulating film 2, but etch the mask 10 only. FIG. 2B indicates this state.

In this case, it can be understood that it is preferable for the insulating film 2 to be deposited in such a shape that the insulating film 2 is cut at the portion indicated by E in FIG. 2A for the purpose of removing efficiently and accurately the mask 10.

That is, when the mask 10 is patterned into a desired shape, it is sufficient to select the form of the edge of the mask 10 to have an inverse taper and the thickness thereof to be greater than that of the insulating film 2.

The state indicated in FIG. 2B is identical to that obtained according to the fabrication method described previously and indicated in FIG. 1D. An explanation of the following fabrication steps will be omitted here, because they are identical to those explained, referring to FIGS. 1E to 1F.

According to this fabrication method, since the insulating film 2 does not undergo any steps such as lapping, etc. after the deposition, no unevenness in the film thickness due to these steps is caused and the head can be completed only with unevenness in the film thickness produced at the moment of the deposition. Consequently, it is possible to obtain a head, in which unevenness in the length of the first gap is small, in a MR type magnetic head with shield corresponding to the thickness of the insulating film 2. Further, since the insulating film undergoes no lapping step, the surface of the signal leadout conductor 3 is not made dirty by lapping liquid, etc. and no oxide is formed on the surface. Furthermore, since it is possible to connect the signal leadout conductor 3 with the shunt film 4 and the MR film 5, there is no fear that the contact therebetween is imperfect due to dirt or oxide and thus, steps for cleaning or removing oxide, etc. after the lapping can be reduced.

Figure 3A:
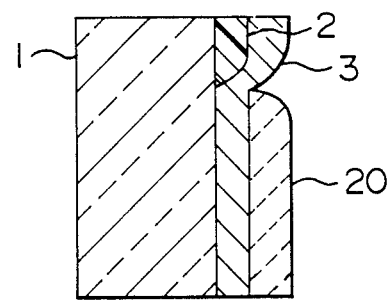
Figure 3B:
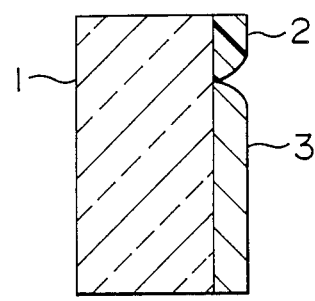

Still another fabrication method will be explained below, referring to FIGS. 3A and 3B, which are longitudinal cross-sectional views illustrating the same portion as that cut along G—G'in FIG. 1A. At first, an insulating film 2, which will be a first head gap, is deposited on the entire surface of an insulating ferrite substrate 1 by a method such as sputtering, etc. Then, only the part of the insulating film 2, where a signal leadout conductor 3 is to be formed, is removed by ion milling or etched off by sputter etch, after a desired pattern mask has been formed by the photolithography. Thereafter, the signal leadout conductor 3 is deposited on the entire surface by a method such as evaporation, sputtering, etc. A resist layer 20 is formed on the place, at which the insulating layer 2 has been etched off by the photolithography. This state is indicated in FIG. 3A. Next, the signal leadout conductor 3 is formed by a method such as ion milling, sputter etch, etc. by using the resist layer 20 as a mask.

Then, the resist layer 20 is removed by using a resist solving solution. This state is indicated in FIG. 3B and it is identical to the state illustrated in FIG. 1D. An explanation of the following fabrication steps will be omitted here, because they are identical to those explained, referring to FIGS. 1E to 1F. According to this fabrication method, the elements on the ferrite substrate 1 side can be formed by fabrication steps, by which two techniques, i.e. the deposition and the photolithography, are applied repeatedly. For this reason, if these two techniques are established, it is possible to fabricate magnetic heads stably, and it can be expected to increase the fabrication yield therefor.

Figure 6:
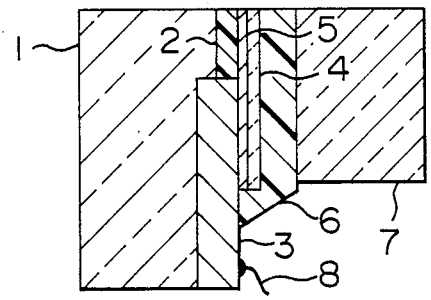
Figure 7:
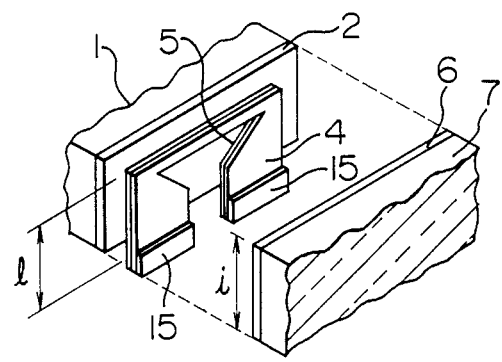
FIGS. 7 and 8A are perspective views illustrating two prior art constructions.

Still another embodiment of this invention will be explained below, referring to FIG. 6. FIG. 6 is a cross-sectional view similar to FIG. 1B and the reference numerals used therein are the same as those used in FIGS. 1A and 1B. In the case where the resistance of the signal leadout conductor 3 indicated in FIGS. 1A and 1B is so great with its film thickness, which is equal to that of the insulating film 2, that it cannot be neglected, the film thickness of the signal leadout conductor 3 may be increased. This embodiment relates to this case, in which the resistance of the signal leadout conductor 3 can be arbitrarily reduced so that it is negligibly small by disposing a step on the surface of the ferrite substrate 1 so that the signal leadout conductor 3 can have a required film thickness and by locating the signal leadout conductor 3 there. It is easy to form the step on the surface of the ferrite substrate 1 by ion milling or sputter etching.

Figure 4:
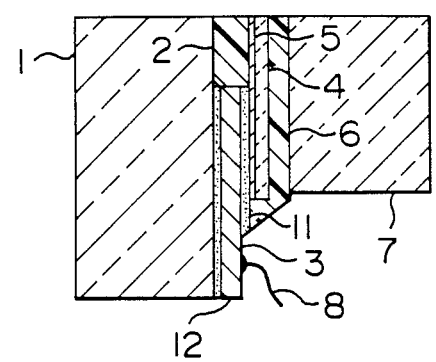
FIGS. 4, 5 and 6 are longitudinal cross-sectional views illustrating other embodiments according to this invention.

In the case where the adhesive force between the insulating ferrite substrate 1 and the signal leadout conductor 3 is weak and they can be easily peeled off, as another structure according to this invention, as indicated in FIG. 4, an adhesion reinforcing film 12, which is suitable for increasing the adhesive force, may be inserted between the ferrite substrate 1 and the signal leadout conductor 3. Further, in the case where the signal leadout conductor 3 and the MR film 5 are made of substances, in which diffusion takes place easily, a diffusion preventing film 11, which is electrically conductive and suitable for preventing diffusion therebetween, may be inserted between the signal leadout conductor 3 and the MR film 5. In this case, the adhesion reinforcing film 12 and the diffusion preventing film 11 are not necessarily used simultaneously, but it is a matter of course that either one of them can be disposed there.

Figure 5:
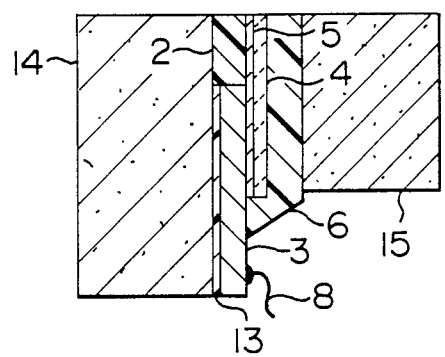

Furthermore, although this invention has been explained until now, referring to structures, in which an insulating ferrite substrate is used as the substrate, in the case where an electrically conductive ferrite substrate such as MnZn ferrite, etc. is used, an insulating film 13 may be formed between the conductive ferrite substrate 14 and the signal leadout conductor 3, as indicated in FIG. 5, so that they are isolated from each other.

According to this invention, since the signal leadout conductor can be formed to the proximity of the extremity of the MR element, it is possible to reduce the resistance of the signal leadout portion to a value almost negligibly small. Consequently, it is possible to reduce the resistance of the overall head to a value as small as possible so that it is almost equal to the resistance of only the extremity portion of the MR element. In this way, an effect can be obtained to have a high performance head permitting to suppress the produced heat due to detection current for detecting the magnetoresistance of the MR film to a value as small as possible, to reduce thermal noise, and to ensure a high S/N ratio. Further, since the signal leadout conductor can be so disposed that it is at the same level as or slightly lower than the surface of the insulating film, which forms the first gap, no undesired crevice is produced due to the thickness of the signal leadout conductor at the gap portion at the extremity of the MR element. Owing to this fact, there is no unevenness due to the undesired crevice described above at the gap portion and thus, a head having good linearity of the gap can be formed. Further, since the signal leadout conductor is disposed in the first gap or in groove formed in the substrate, the first and the second gaps can be made extremely small. Thus, effects can be obtained that a head having narrow gaps is formed in a simple manner and that a high performance head for high density recording reproduction can be fabricated.

We claim:

1. A magnetoresistance type magnetic head comprising:
   a first substrate comprising a soft magnetic material;
   a first insulating layer provided on one surface of said first substrate;
   a magnetoresistance film layer provided over said first insulating layer;
   conductor leads provided between said first substrate and said magnetoresistance film layer, at least a portion of said conductor leads contacting said magnetoresistance film layer for leading out a signal from said magnetoresistance film layer;
   a second insulating layer provided over said magnetoresistance film layer; and
   a second substrate comprising a soft magnetic material provided over said second insulating layer.

2. A magnetoresistance type magnetic head according to claim 1, wherein each of said conductor leads has a major surface remote from said first substrate, said first insulating layer has a major surface remote from said first substrate, and said conductor leads are disposed in said first insulating layer such that said major surface of each of said conductor leads is at the same level relative to said first substrate as said first major surface of said first insulating layer.

3. A magnetoresistance type magnetic head according to claim 1, wherein a shunt film is provided between said magnetoresistance film layer and said second insulating layer and is in contact with said magnetoresistance film layer.

4. A magnetoresistance type head according to claim 3, wherein said first substrate is made of insulating ferrite; said conductor leads are made of a low resistivity metal; said magnetoresistance film is made of Permalloy; and said shunt film is made of a low resistivity metal.

5. A magnetoresistance type magnetic head according to claim 1, wherein each of said conductor leads is so formed as to have a predetermined thickness and a part thereof is buried in a groove formed in said first substrate.

6. A magnetoresistance type head according to claim 1, wherein an adhesion reinforcing film is formed between said first substrate and each of said conductor leads.

7. A magnetoresistance type head according to claim 1, wherein a diffusion preventing film is formed between each of said conductor leads and said magnetoresistance film.

8. A magnetoresistance type magnetic head according to claim 1, wherein said first substrate is made of electrically conductive ferrite and an insulating film is formed between said electrically conductive ferrite substrate and said conductor leads.

9. A magnetoresistance type magnetic head comprising:
- a first substrate comprising a soft magnetic material having opposed first and second major surfaces and opposed front and rear ends;
- a first insulating layer provided on said first major surface of said first substrate in a predetermined pattern, a portion of said first insulating layer adjacent said front end of said substrate serving as a first head gap;
- a plurality of elongated signal leadout conductors made of a low resistivity material provided on said first major surface of said first substrate in openings in said predetermined pattern of said first insulating layer, each of said plurality of elongated signal leadout conductors having a first end portion adjacent said front end of said first substrate and a second end portion adjacent said rear end of said first substrate;
- a magnetoresistance film provided over at least said portion of said first insulating layer serving as a first head gap and said first end portion of each of said plurality of elongated signal leadout conductors, said magnetoresistance film provided so as to be in contact with said first end portion of each of said plurality of elongated signal leadout conductors;
- a second insulating layer provided over said magnetoresistance film and portions of said plurality of elongated leadout conductors; and
- a second substrate comprising a soft magnetic material provided over said second insulating layer.

10. A magnetoresistance type magnetic head according to claim 9, wherein said first substrate is made of insulating ferrite.

11. A magnetoresistance type magnetic head according to claim 9, wherein said first substrate is made of electrically conductive ferrite and has an insulating film providing between said electrically conductive ferrite and said plurality of elongated signal leadout conductors.

12. A magnetoresistance type magnetic head according to claim 9, wherein said second substrate is made of insulating ferrite.

13. A magnetoresistance type magnetic head according to claim 9, wherein said second substrate is made of electrically conductive ferrite.

14. A magnetoresistance type magnetic head according to claim 9, further comprising a plurality of leads, each of said plurality of leads contacting said second end portion of each of said plurality of elongated signal leadout conductors.

15. A magnetoresistance type magnetic head according to claim 9, further comprising a shunt film provided on said magnetoresistance film, said shunt film being provided between said magnetoresistance film and said second insulating layer.

16. A magnetoresistance type magnetic head according to claim 15, wherein said shunt film is made of a material selected from the group consisting of Ti, Mo and Ta.

17. A magnetoresistance type magnetic head according to claim 15, wherein said shunt film has a thickness of 100 to 300 nm.

18. A magnetoresistance type magnetic head according to claim 9, wherein each of said plurality of elongated signal leadout conductors has a major surface remote from said first substrate, said first insulating layer has a major surface remote from said first substrate, and said major surface of each of said plurality of elongated signal leadout conductors is at the same level relative to said first major surface of said first substrate as said major surface of said first insulating layer.

19. A magnetoresistance type magnetic head according to claim 9, wherein said magnetoresistance film is made of Permalloy.

20. A magnetoresistance type magnetic head according to claim 9, wherein said magnetoresistance film has a thickness of 20 to 100 nm.

21. A magnetoresistance type magnetic head according to claim 9, wherein said first insulating layer has a thickness of 0.4 to 0.8 μm.

22. A magnetoresistance type magnetic head according to claim 9, wherein each of said first and second insulating layers is made of an inorganic insulating material.

23. A magnetoresistance type magnetic head according to claim 9, wherein each of said first an second insulating layers is made of a material selected from the group consisting of alumina and silicon dioxide.

* * * * *